(12) United States Patent
Spear (10) Patent No.: US 7,825,534 B2
(45) Date of Patent: Nov. 2, 2010

(54) RELAY ASSEMBLY FOR FOG LIGHTS

(76) Inventor: Brian Spear, 10046 Big Bend Rd., St. Louis, MO (US) 63122

( * ) Notice: Subject to any disclaimer, the term of this patent is extended or adjusted under 35 U.S.C. 154(b) by 790 days.

(21) Appl. No.: 11/805,814

(22) Filed: May 24, 2007

(65) Prior Publication Data

US 2008/0290802 A1 Nov. 27, 2008

(51) Int. Cl.
*B60L 1/14* (2006.01)
(52) U.S. Cl. ............... 307/10.8; 361/166; 361/191; 361/160; 315/77; 315/82
(58) Field of Classification Search ............. 315/77, 315/82, 83, 76; 307/10.1, 10.8, 9.1; 361/160, 361/166, 190, 191; 340/458, 468
See application file for complete search history.

(56) References Cited

U.S. PATENT DOCUMENTS

| | | | |
|---|---|---|---|
| 3,360,681 A * | 12/1967 | Kohler et al. | 315/83 |
| 3,500,120 A * | 3/1970 | Schultz | 315/82 |
| 3,591,845 A | 7/1971 | Vanderpoel, Jr. | |
| 4,280,062 A | 7/1981 | Miller et al. | |
| 4,831,310 A * | 5/1989 | Heintzberger et al. | 315/77 |
| 4,928,036 A | 5/1990 | Abboud | |
| 5,120,981 A | 6/1992 | Cope | |
| 5,420,480 A | 5/1995 | Knepel et al. | |
| 5,798,687 A | 8/1998 | Littlejohn et al. | |
| 5,925,941 A | 7/1999 | Kofink | |
| 6,005,300 A | 12/1999 | Kelly | |
| 6,265,829 B1 | 7/2001 | Perdec | |
| 6,273,729 B1 | 8/2001 | Kelly | |
| 6,384,538 B1 * | 5/2002 | Lange et al. | 315/77 |
| 6,504,306 B2 | 1/2003 | Menze | |
| 6,614,127 B1 | 9/2003 | Daniels | |

* cited by examiner

*Primary Examiner*—Haissa Philogene
(74) *Attorney, Agent, or Firm*—David H. Chervitz (57) ABSTRACT

A relay assembly for a fog light is disclosed which comprises a relay housing having a first terminal adapted to being connected to a switch for operating another light and operation of the switch for illuminating a fog light.

20 Claims, 6 Drawing Sheets

RELAY ASSEMBLY FOR FOG LIGHTS

BACKGROUND OF THE INVENTION

This invention relates to a circuit for controlling the operation of motor vehicle fog lights and more particularly to a relay assembly for controlling the operation of fog lights for an automobile.

Automobiles are manufactured having headlights used to project beams of light during periods of darkness or low light. Such headlights may produce high beams, low beams, and day time driving beams. Automobiles may also be fitted with fog lights that assist with driving in fog conditions. Additionally, fog lights are used to improve visibility at night and during severe weather conditions. Some drivers prefer that fog nights be illuminated whenever the headlights are operated to enhance visibility and safety. Automobiles may use photo detectors connected to the headlights to automatically turn on the headlights when low light or no light is detected. A light switch may be provided on a dashboard of an automobile that may have several different settings. For example, the light switch may be set to auto, off, on, or day light running position. Some light switches are set initially in the auto position and it is incumbent upon the driver to manually select a different setting. For example, if the photo sensor does not detect a low light condition then the driver will have to manually move the light switch into the on position or setting. By way of another example, if the photo sensor falsely turns on the lights the driver may manually turn the light switch to the off position.

In the motor vehicles where the light switch is initially set on the auto setting the only way in which to operate the fog lights is to manually select or press a fog light switch. In this arrangement once the car is stopped and the key is removed from the ignition switch the fog light switch is automatically reset. This means that when the car is again operated and the driver desires the fog lights illuminated the driver must press the fog light switch to turn on the fog lights. This arrangement is cumbersome for a few reasons. First, the driver must always operate a switch in order to illuminate the fog lights. As can be appreciated, if the driver needs to operate the fog light switch while driving this could distract the attention of the driver and lead to an accident. Second, if the driver wants to operate the fog lights upon restarting the car the driver must operate the fog light switch. Third, since the fog lights operate with a beam of light that is difficult to perceive the driver might forget to manually turn the fog light switch on and drive without the benefit of fog lights. Fourth, some drivers of motor vehicles prefer to have the fog lights illuminated whenever the headlights are illuminated and this forces the driver to always manually select the fog light switch whenever the headlights are automatically illuminated.

Therefore, it would be desirable and advantageous to have a relay assembly that is capable of automatically operating fog lights. It would also desirable to have a relay assembly that can automatically operate fog lights whenever the headlights, parking lights, or some other lights for a vehicle are illuminated or operated. Also, it would be advantageous to have a relay assembly that can be retrofitted into existing vehicles to have fog lights that illuminate whenever the headlights are illuminated. The present invention is designed to obviate and overcome many of the disadvantages and shortcomings associated with typical illumination systems. Moreover, the present invention is designed to provide a relay assembly that is capable of automatically operating a pair of fog lights on a vehicle.

SUMMARY OF THE INVENTION

In one form of the present invention, a relay assembly for fog lights comprises a relay housing having a first terminal adapted to being connected to a switch for operating another light and operation of the switch for illuminating a fog light.

In another form of the present invention, a relay assembly for fog lights comprises a first relay portion having a coil and a switch operated by the coil, a first terminal connected to the coil, a second terminal connected to the coil, a third terminal connected to the switch, and a fourth terminal connected to the switch, a second relay portion having a first terminal, and a connection between the first terminal of the second relay portion and the third terminal of the first relay portion.

In yet another form of the present invention, a relay assembly for fog lights comprises a housing having a first relay receiving portion and a second relay receiving portion, the first relay portion being connected to a first terminal, a second terminal, a third terminal, and a fourth terminal, the second relay receiving portion being connected to a first terminal, and a connection between the first terminal of the second relay receiving portion and one of the terminals of the first relay receiving portion.

In light of the foregoing comments, it will be recognized that a principal object of the present invention is to provide a relay assembly for controlling the operation of fog lights of an automobile.

A further object of the present invention is to provide a relay assembly for fog lights that is of simple construction and design and which can be easily employed with highly reliable results.

Another object of the present invention is to provide a relay assembly for fog lights that does not require any special tools for installation.

A still further object of the present invention is to provide a relay assembly for fog lights for an automobile that when installed does not void any terms of a vehicle warranty.

Another object of the present invention is to provide a relay assembly for fog lights that is assembled from common and inexpensive parts.

A further objection of the present invention is to provide a relay assembly for fog lights that may be retrofitted into an existing vehicle.

A still further object of the present invention is to provide a relay assembly for fog lights that is of unitary construction for easy transportation, installation, and use.

Another object of the present invention is to provide a relay assembly for fog lights that are automatically illuminated whenever a light in a vehicle is automatically illuminated.

These and other objects and advantages of the present invention will become apparent after considering the following detailed specification in conjunction with the accompanying drawings, wherein:

DETAILED DESCRIPTION OF THE PREFERRED EMBODIMENTS

Figure 1:
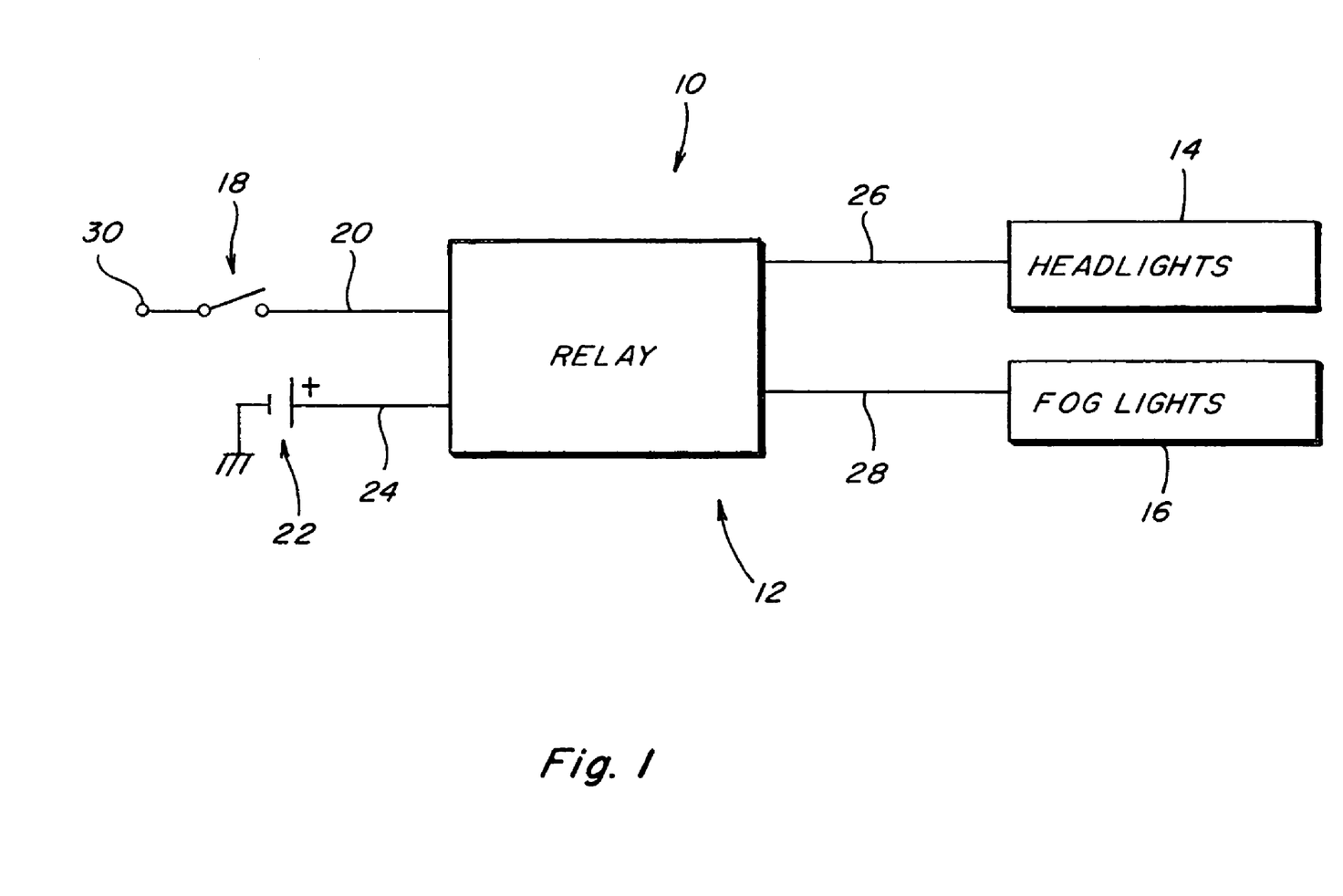
FIG. 1 is a partial schematic and block diagram of a preferred embodiment of a relay assembly for fog lights constructed according to the present invention.

Referring now to the drawings, wherein like numbers refer to like items, number 10 identifies a preferred embodiment of a relay assembly for fog lights constructed according to the present invention. With reference now to FIG. 1, the relay assembly 10 is shown connected in a circuit 12 that is used to illuminate headlights 14 and fog lights 16 that are found on an automobile (not shown). The relay assembly 10 is connected to a headlight switch 18 by a wire 20. The relay assembly 10 is also connected to a battery 22 via a wire 24. The headlights 14 are connected to the relay assembly 10 by a connection 26 and the fog lights 16 are also connected to the relay assembly 10 via a connection 28. A junction 30 is connected to a power source such as the battery 22 so that when the switch 18 is closed power is provided to the relay assembly 10.

In operation, when the switch 18 is operated a voltage is provided to the relay assembly 10 which will in turn provide power to the headlights 14 and the fog lights 16. In this manner whenever the switch 18 is operated the headlights 14 and the fog lights 16 will be illuminated. Although not shown in detail, the switch 18 may be a multi-position switch in which several settings are possible. For example, the switch 18 may have several settings such as automatic, on, or off. It is also possible that the switch 18 is initially set on the automatic position and the headlights 14 and the fog lights 16 will automatically be illuminated whenever the automatic condition is sensed. If the switch 18 is initially set on the automatic position then once the automobile is operated by use of an ignition switch, the headlights 14 and the fog lights 16 will automatically illuminate without the need for pressing a switch. Further, it is contemplated that the headlights 14 may be other lights in an automobile. For example, it may be desirable that the fog lights 16 be illuminated whenever other lights, such as parking lights, are illuminated.

Figure 2:
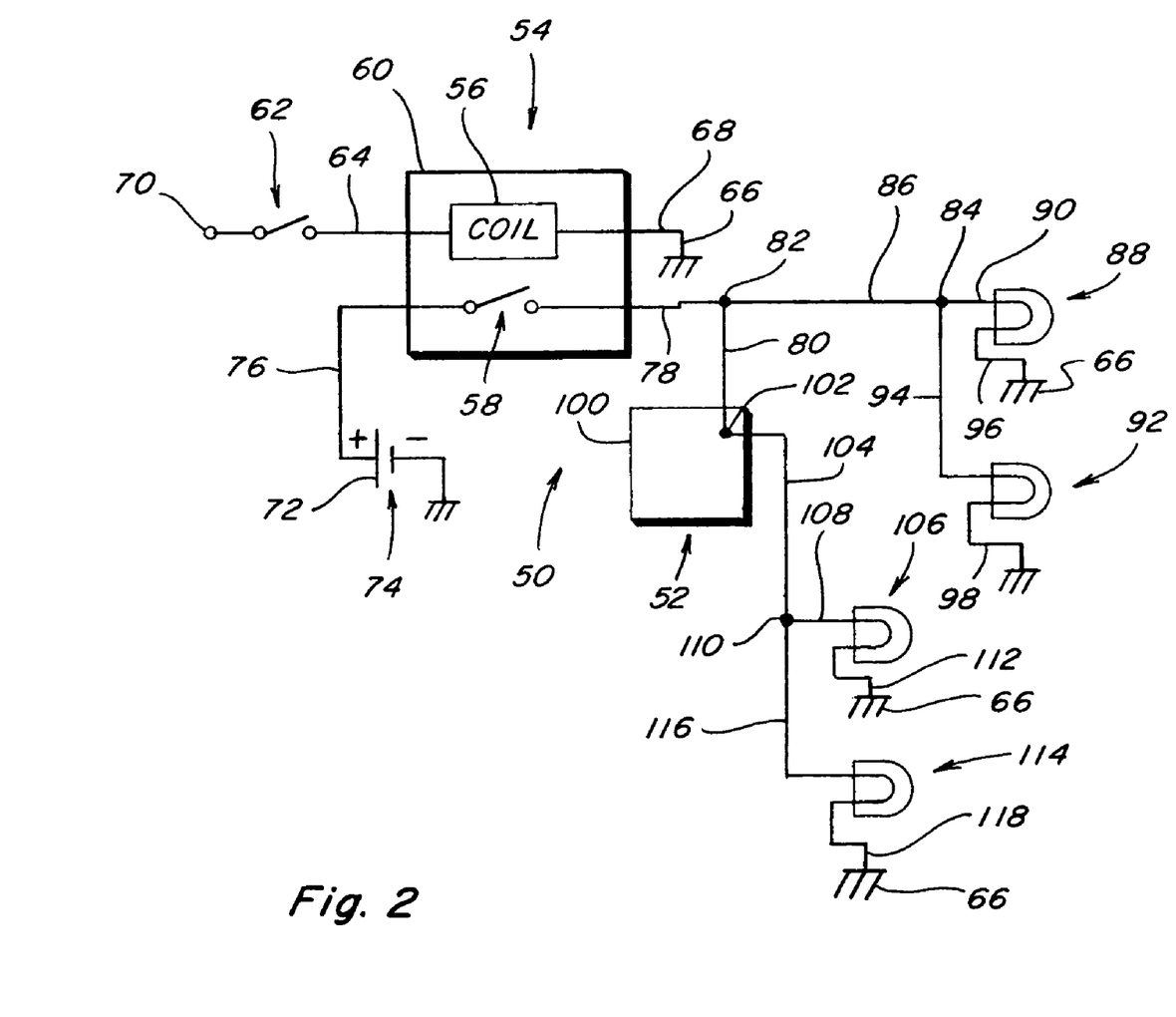
FIG. 2 is a partial schematic and block diagram of another preferred embodiment of a relay assembly for fog lights constructed according to the present invention.

FIG. 2 is a partial schematic and block diagram of another preferred embodiment of the relay assembly 50 constructed according to the present invention. The relay assembly 50 comprises a modified relay portion 52 connected to a relay 54. The relay 54 includes a coil portion 56 and a switch portion 58. The relay 54 is enclosed by an enclosure or housing 60 that has four terminals (not shown) that are mated into a relay receptacle (not shown) associated with an automobile (also not shown). The coil portion 56 is connected to a switch 62 by a wire 64 and to ground 66 by a wire 68. The switch 62 is connected to power at a junction 70. The switch portion 58 is connected to a positive terminal 72 of a battery 74 by a wire 76. The switch portion 58 is also connected to an output connection or wire 78. The output connection 78 is connected to the modified relay 52 via a wire 80 at a junction 82 and also to a junction 84 by a wire 86. The junction 84 is connected to a left headlight 88 by a wire 90 and to a right headlight 92 via a wire 94. The left headlight 88 is connected to ground 66 by a wire 96. Also, the right headlight 92 is connected to ground 66 by a wire 98.

The modified relay portion 52 consists of a housing 100 that contains a terminal 102 that is adapted to fit into a relay receptacle (not shown). The modified relay 52 may include other terminals that fit into a relay receptacle (not shown) to hold the modified relay 52 in place within a motor vehicle. The terminal 102 is connected to the wire 80 and also to a wire 104. The wire 104 is further connected to a left fog light 106 by a wire 108 at a junction 110. The left fog light 106 is also connected to ground 66 via a wire 112. A right fog light 114 is connected to the junction 110 by a wire 116. The right fog light 114 is also connected to ground by a wire 118.

Further, the modified relay portion 52 may also be the relay 54 with the connections 64, 68, and 76 removed from the relay 54 or the terminals (not shown) eliminated from the relay 54. It is also possible and contemplated that the modified relay 52 can be of unitary construction with the relay 54 and be sized and shaped to fit into the existing relay receptacles in the vehicle. In this manner, the relay assembly 50 can replace the existing relays in the vehicle. In order to accomplish this, the existing relays are removed from their respective relay receptacles and the relay assembly 50 is inserted into the open relay receptacles. The relay assembly 50 may be sold as a single unit to replace the existing relays in an automobile.

The operation of the relay assembly 50 is as follows. When the switch 62 is operated power is provided to the coil 56. The coil 56 is energized causing the switch 58 to close. Upon the closing of the switch 58, power from the battery 74 is provided to the headlights 88 and 92 to illuminate the headlights 88 and 92. Also, power is provided to the fog lights 106 and 114 via wire 78, junction 82, wire 80, terminal 102, wire 104, junction 110, and wires 108 and 116. In this manner whenever the headlights 88 and 92 are illuminated the fog lights 106 and 114 will also be illuminated. The driver or operator of the automobile only has to operate one switch in order to illuminate the headlights 88 and 92 and the fog lights 106 and 114 at the same time. In vehicles in which the switch 62 is a multi-position switch the headlights 88 and 92 may automatically be illuminated without the driver operating the switch 62. In this situation the switch 62 is connected to a photo sensor and when the photo sensor detects a condition in which the headlights 88 and 92 should be illuminated power will be provided to the coil 56 to illuminate both the headlights 88 and 92 and the fog lights 106 and 114 automatically without intervention from the driver.

Figure 3:
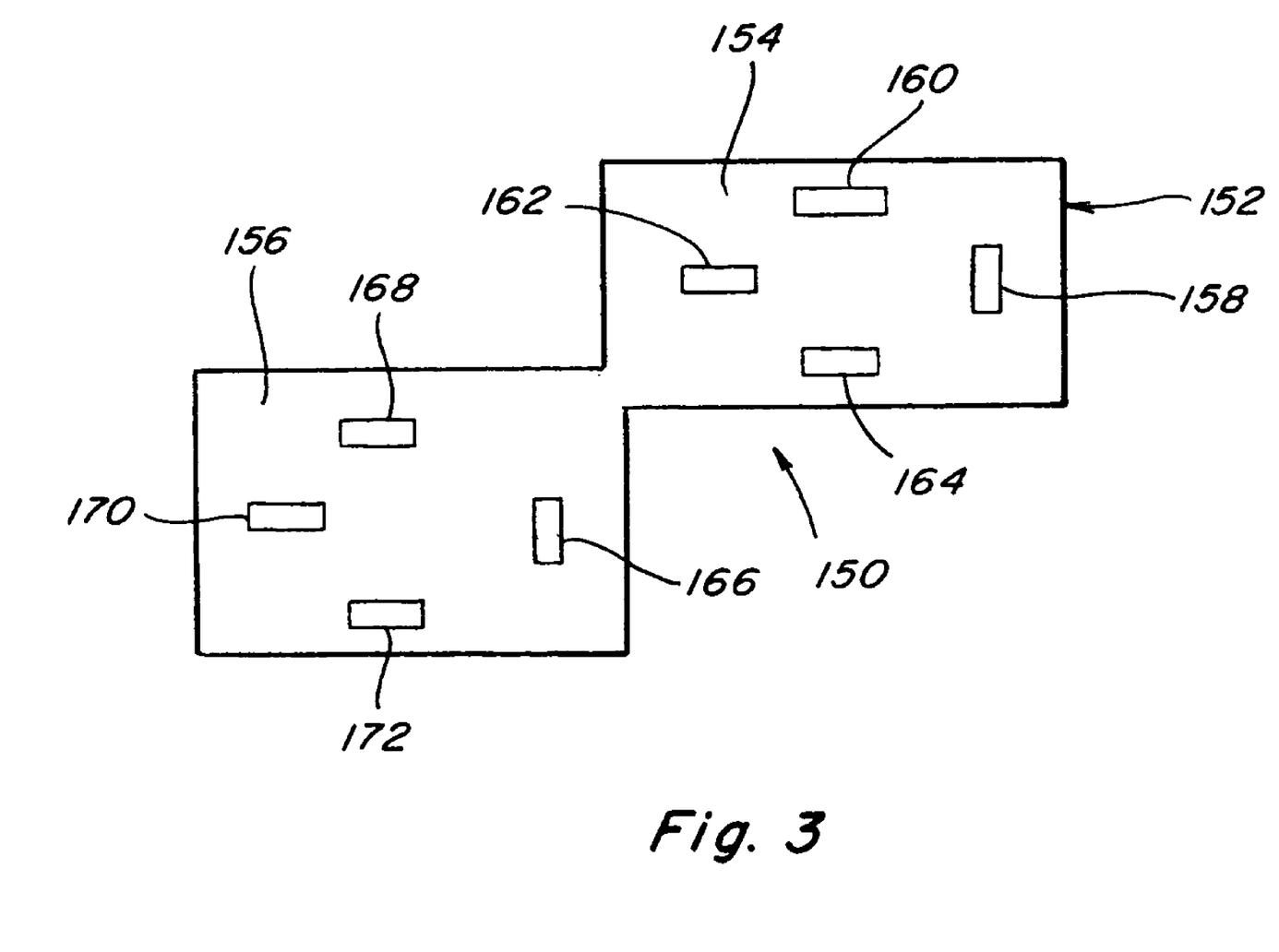
FIG. 3 is a bottom view of another preferred embodiment of a relay assembly for fog lights constructed according to the present invention.

With reference now to FIG. 3, a bottom view of a relay assembly 150 is shown. The relay assembly 150 is of unitary construction having a housing 152 that encloses a relay portion 154 and a modified relay portion 156. The internal construction of the relay portion 154 is similar to the relay 54 shown in FIG. 2. The internal construction of the relay 156 is similar to the relay 52 shown in FIG. 2. The relay portion 154 has a first terminal 158, a second terminal 160, a third terminal 162, and a fourth terminal 164. The terminals 158, 160, 162, and 164 are adapted to mate or be inserted into a relay receptacle (not shown) provided in an automobile. By way of example and with reference back to FIG. 2, the first terminal 158 may be connected to the switch 62, the second terminal 160 may be connected to the wire 68, the third terminal may be connected to the battery 74, and the fourth terminal 164 may be connected to the headlights 88 and 92.

The relay portion 156 has a first terminal 166, a second terminal 168, a third terminal 170, and a fourth terminal 172. The second terminal 168, the third terminal 170, and the fourth terminal 172 are dummy terminals and are not connected to any electrical components. These terminals 168, 170, and 172 are provided for being inserted into a relay receptacle (not shown) provided in an automobile to help hold the relay portion 156 in place. Again by way of example and with reference back to FIG. 2, the first terminal 166, which is similar to the terminal 102, may be connected to the switch portion 58 of the relay 54. As can be appreciated, the wires 78 and 80 may be internal within the relay assembly 150.

Figure 4:
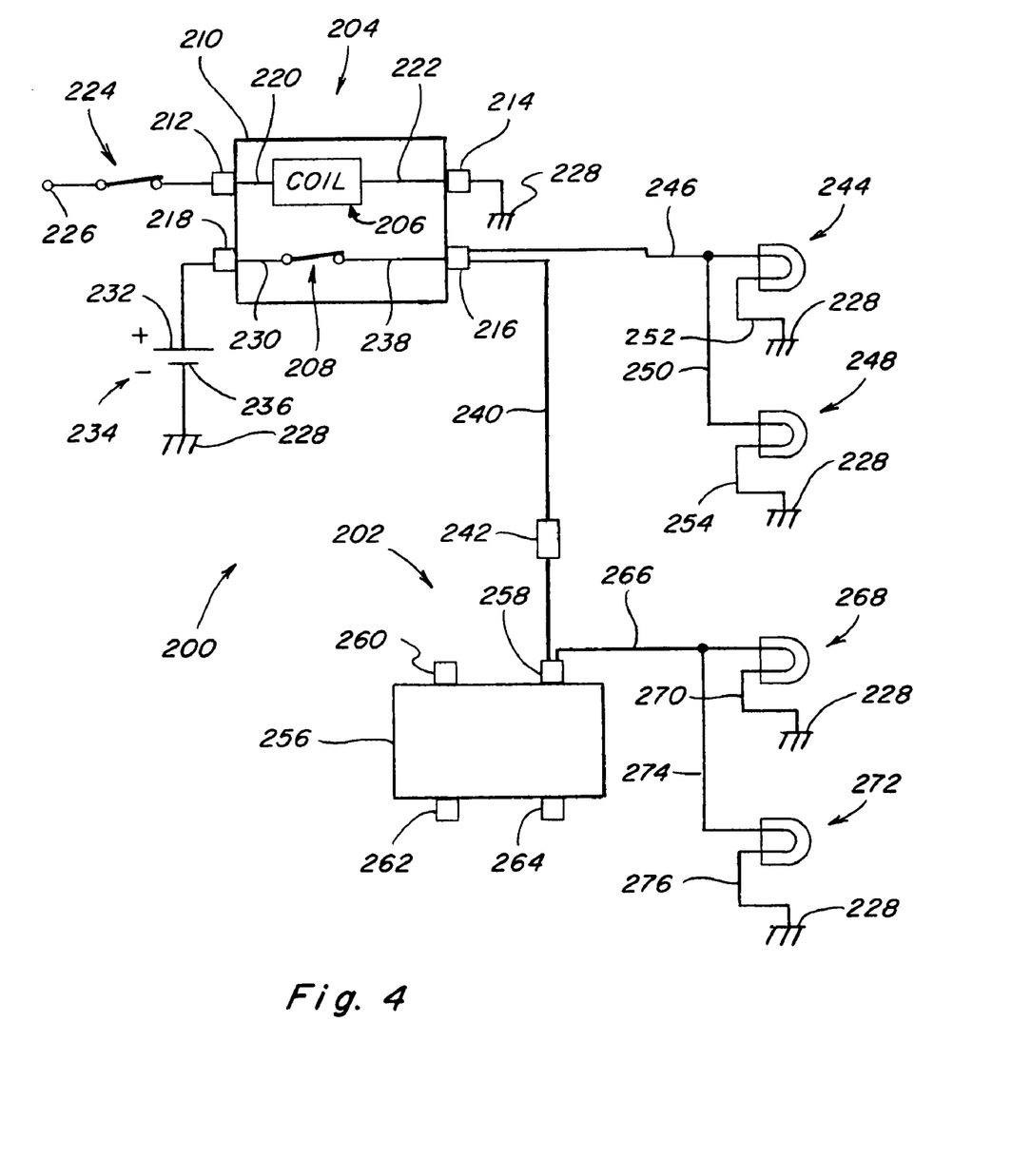
FIG. 4 is a partial schematic and block diagram of another preferred embodiment of a relay assembly for fog lights constructed according to the present invention.

FIG. 4 illustrates another preferred embodiment of a relay assembly for fog lights 200. The relay assembly 200 comprises a modified relay 202 connected to a relay 204. The relay 204 includes a coil portion 206 and a switch portion 208. The relay 204 is enclosed by an enclosure or housing 210 that has a first terminal 212, a second terminal 214, a third terminal 216, and a fourth terminal 218. The first terminal 212 is connected to a first end 220 of the coil 206 and the second terminal 214 is connected to a second end 222 of the coil 206. The first terminal 212 is also connected to a switch 224, which is shown in the closed position. The switch 224 is provided power at a junction or connection 226. The second terminal 214 is connected to ground 228. The terminals 212, 214, 216, and 218 are mated into a relay receptacle (not shown) associated with an automobile (also not shown).

The fourth terminal 218 is connected to a first end 230 of the switch portion 208. The fourth terminal 218 is in turn connected to a positive terminal 232 of a battery 234. A negative terminal 236 of the battery 234 is connected to ground 228. The switch portion 208 has a second end 238 that is connected to the third terminal 216. The third terminal is connected to the modified relay 202 via a wire 240 and a fuse 242. Further, the third terminal is connected to a left headlight 244 by a wire 246 and to a right headlight 248 via a wire 250. The left headlight 244 is connected to ground 228 by a wire 252. Also, the right headlight 248 is connected to ground 228 by a wire 254.

The modified relay 202 consists of a housing 256 that contains a first terminal 258, a second terminal 260, a third terminal 262, and a fourth terminal 264. The first terminal 258 is connected to the third terminal 216 of the relay portion 204 by the wire 240 and the fuse 242. The second terminal 260, the third terminal 262, and the fourth terminal 264 are dummy terminals and have no electrical connections. All of the terminals 258, 260, 262, and 264 of the modified relay 202 are adapted to fit into a relay receptacle (not shown) to hold the modified relay 202 in place within a motor vehicle. The first terminal 258 of the modified relay 202 is connected by a wire 266 to a left fog light 268. The left fog light 268 is also connected to ground 228 via a wire 270. A right fog light 272 is connected to the wire 266 by a wire 274. The right fog light 272 is also connected to ground 228 by a wire 276.

It is also possible and contemplated that the modified relay 202 and the relay 204 can be housed in a single housing and can be of unitary construction. The relays 202 and 204 are sized and shaped to fit into the existing relay receptacles in the vehicle. In this manner, the relay assembly 200 can replace the existing relays in the vehicle. In order to accomplish this, the existing relays are removed from their respective relay receptacles and the relay assembly 200 is inserted into the open relay receptacles. The relay assembly 200 may be sold as a single unit to replace the existing relays in an automobile.

The operation of the relay assembly 200 is as follows. When the switch 224 is operated power is provided to the coil portion 206 of the relay 204. The coil portion 206 is energized causing the switch portion 208 to close. Upon the closing of the switch portion 208, power from the battery 234 is provided to the headlights 244 and 248 to illuminate the headlights 244 and 248. Also, power is provided to the fog lights 268 and 272. In this manner whenever the headlights 244 and 248 are illuminated the fog lights 268 and 272 will also be illuminated. The driver or operator of the automobile only has to operate one switch in order to illuminate the headlights 244 and 248 and the fog lights 268 and 272 at the same time. In vehicles in which the switch 224 is a multi-position switch the headlights 244 and 248 may automatically be illuminated without the driver operating the switch 224. As has been previously indicated, in this situation the switch 224 is connected to a photo sensor and when the photo sensor detects a condition in which the headlights 244 and 248 should be illuminated power will be provided to the coil portion 206 to illuminate both the headlights 244 and 248 and the fog lights 268 and 272 automatically without involvement from the driver.

Due to the different wiring of various vehicles it is possible that the modified relay 202 may need to be connected to a different relay than the headlight relay. For example, some manufacturers use the headlight relay to power day time running lights. In this particular situation the relay that needs to be tapped off of may be the parking lamp relay instead of the headlight relay.

Figure 5:
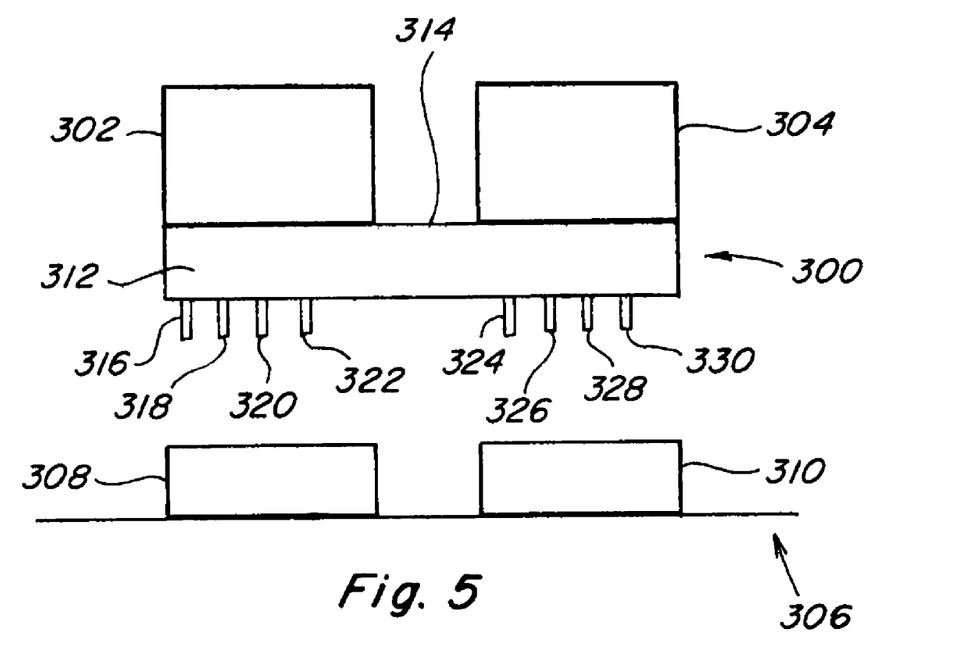
FIG. 5 is a front perspective view of another preferred embodiment of a relay assembly for fog lights constructed according to the present invention.

With particular reference now to FIG. 5, another preferred embodiment of a relay assembly 300 is shown. The relay assembly 300 is employed to be used with existing relays such as a headlight relay 302 and a fog light relay 304 in an automobile 306. The relay 302 is removed from the existing headlight relay receptacle 308 and the relay 304 is removed from the existing fog light relay receptacle 310. Once removed, the relays 302 and 304 are inserted into the relay assembly 300 in sockets (not shown) provided in the relay assembly 300. The relay assembly 300 comprises a body 312 that has a top 314 having sockets (not shown) adapted for receiving terminals (not shown) associated with each of the relays 302 and 304. The relay assembly 300 also comprises terminals 316, 318, 320, and 322 that are adapted to mate in the headlight relay receptacle 308 and terminals 324, 326, 328, and 330 that are adapted to mate in the fog light relay receptacle 310. As can be appreciated from the above discussion, terminals 326, 328, and 330 may be dummy terminals and are used to hold the relay assembly 300 in place. Further, within the relay assembly 300 the socket portion (not shown) may include insulators that effectively disconnect the fog light relay 304 from being in any circuit, as has previously been discussed in detail. Although not shown, internal to the relay assembly 300 there is a connection between the headlight relay 302 and the fog light relay 304. By way of example, a wire may be connected to the terminal 322 of the headlight relay 302 and the terminal 324 of the fog light relay 304. In this manner when power is provided to the headlight relay 302 power will also be provided to the fog light relay 304 to illuminate fog lights (not shown) associated with the automobile 306.

Figure 6:
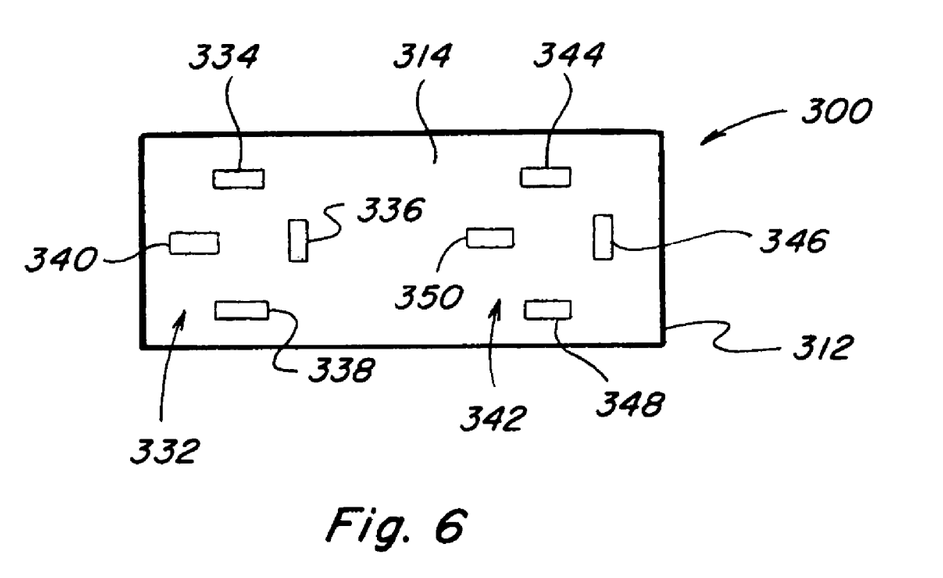
FIG. 6 is a top view of the relay assembly for fog lights shown in FIG. 5.

FIG. 6 illustrates a top view of the relay assembly 300. The relay assembly 300 is shown to comprise the body 312 and the top 314. The top 314 has a first relay receiving portion 332 adapted for receiving the terminals (not shown) associated with the headlight relay 302. The first relay receiving portion 332 has a first terminal socket 334, a second terminal socket 336, a third terminal socket 338, and a fourth terminal socket 340. The terminal sockets 334, 336, 338, and 340 of the first relay receiving portion 332 are connected to the terminals 316, 318, 320, and 322. The top 314 also has a second relay receiving portion 342 adapted for receiving the terminals (not shown) associated with the fog light relay 304. The second relay receiving portion has a first terminal socket 344, a second terminal socket 346, a third terminal socket 348, and a fourth terminal socket 350. As previously indicated, the terminal sockets 346, 348, and 350 may include insulators to block the corresponding terminals of the fog light relay 304 from being connected in a circuit. Further, the first terminal socket 344 may be connected to the terminal 324.

It is also possible that the relay receptacles 308 and 310 may not be in close proximity with each other in the automobile 306. In this particular situation the relay assembly 300 may have a different configuration that the body 312. For example, if the fog light relay receptacle 310 is ten inches from the headlight relay receptacle 308 the body 312 will have to be configured accordingly to span the distance between the fog light relay receptacle 310 and the headlight relay receptacle 308.

Figure 7:
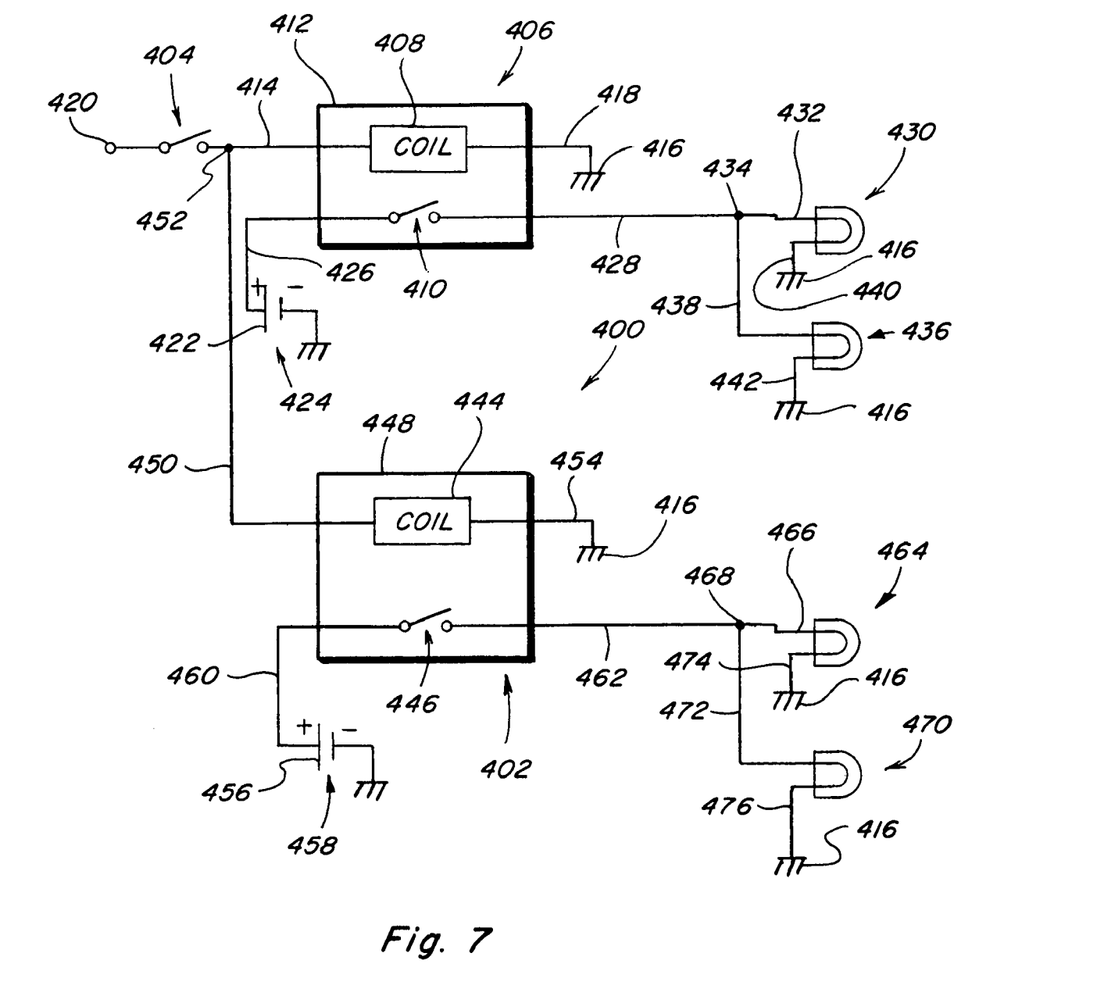
FIG. 7 is a partial schematic and block diagram of another preferred embodiment of a relay assembly for fog lights constructed according to the present invention.

FIG. 7 illustrates another preferred embodiment of a relay assembly for fog lights 400. The relay assembly 400 comprises a modified relay portion 402 connected to a switch 404 which is connected to a relay 406. The relay 406 includes a coil portion 408 and a switch portion 410. The relay 406 is enclosed by an enclosure or housing 412 that has four terminals (not shown) that are mated into a relay receptacle (not shown) associated with an automobile (also not shown). The coil portion 408 is connected to the switch 404 by a wire 414 and to ground 416 by a wire 418. The switch 404 is connected to power at a junction 420. The switch portion 410 is connected to a positive terminal 422 of a battery 424 by a wire 426. The switch portion 410 is also connected to an output connection or wire 428. The output connection 428 is connected to a left headlight 430 by a wire 432 and at a junction 434 to a right headlight 436 via a wire 438. The left headlight 430 is connected to ground 416 by a wire 440. Also, the right headlight 436 is connected to ground 416 by a wire 442.

The modified relay portion 402 includes a coil portion 444 and a switch portion 446. The relay 402 is enclosed by an enclosure or housing 448. The coil portion 444 is connected to the switch 404 by a wire 450 at a junction 452. The coil portion 444 is also connected to ground 416 by a wire 454. The switch portion 446 is connected to a positive terminal 456 of a battery 458 by a wire 460. The battery 458 may be the same as the battery 424. The switch portion 446 is also connected to an output connection or wire 4628. The output connection 462 is connected to a left fog light 464 by a wire 466 and at a junction 468 to a right fog light 470 via a wire 472. The left fog light 464 is connected to ground 416 by a wire 474. Also, the right fog light 470 is connected to ground 416 by a wire 476.

The modified relay portion 402 has three terminals (not shown) that are mated into a relay receptacle (not shown) associated with an automobile (also not shown). However, a fourth terminal (not shown) is connected to the wire 450 and is not electrically connected to a terminal opening associated with the relay receptacle (not shown). In a sense the modified relay portion 402 is modified in that it has one terminal that is not electrically connected to the relay receptacle and is modified to receive power over the wire 450. Although not shown, it is possible for the modified relay portion 402 to have a terminal that may be mated with the relay receptacle but such terminal is isolated from having an electrical connection to the modified relay portion 402.

The operation of the relay assembly 400 is as follows. When the switch 404 is operated power is provided to the coils 408 and 444. The coil 408 is energized causing the switch portion 410 to close. Upon the closing of the switch portion 410, power from the battery 424 is provided to the headlights 430 and 436 to illuminate the headlights 430 and 436. Also, the coil 444 is energized at the same time the coil 408 is energized which will cause the switch portion 446 to operate. Upon operation of the switch portion 446, power from the battery 458 is provided to the fog lights 464 and 470. In this manner whenever the headlights 430 and 436 are illuminated the fog lights 464 and 470 will also be illuminated. The driver or operator of the automobile only has to operate one switch in order to illuminate the headlights 430 and 436 and the fog lights 464 and 470 at the same time. In vehicles in which the switch 404 is a multi-position switch the headlights 430 and 436 may automatically be illuminated without the driver operating the switch 404. In this situation the switch 404 is connected to a photo sensor and when the photo sensor detects a condition in which the headlights 430 and 436 should be illuminated power will be provided to the coils 408 and 444 to illuminate both the headlights 430 and 436 and the fog lights 464 and 470 automatically without intervention from the driver.

The relay assembly 400 may be used instead of the relay assembly 50 or the relay assembly 200 in order to reduce the wear on the relay 54 or 204. It may be that the relays 54 and 204 may have to be resized due to the power being used to illuminate both the headlights 88 and 92 and the fog lights 106 and 114 in the relay assembly 50 or the headlights 244 and 248 and the fog lights 268 and 272 in the relay assembly 200. The relays that were originally in the motorized vehicle may have to be replaced with relays that can handle a higher power or current load or output.

As can be appreciated and as has been previously discussed, the headlights 430 and 436 may be other lights in an automobile or truck, such as parking lights, and the wire 450 would be connected to a switch associated with such lights. In this manner, when the lights are operated the fog lights 464 and 470 will also be illuminated. Although not shown, it is also possible that the wire 450 may include a fuse.

From all that has been said, it will be clear that there has thus been shown and described herein a relay assembly for fog lights which fulfills the various objects and advantages sought therefore. It will become apparent to those skilled in the art, however, that many changes, modifications, variations, and other uses and applications of the subject relay assembly for fog lights are possible and contemplated. All changes, modifications, variations, and other uses and applications which do not depart from the spirit and scope of the invention are deemed to be covered by the invention, which is limited only by the claims which follow.

What is claimed is:

1. A relay assembly for a fog light comprising a relay housing having a first terminal adapted to being connected to a switch for operating a first light and a fog light with operation of the switch for illuminating the fog light and the first light.

2. The relay assembly for a fog light of claim 1 further comprising a second terminal, a third terminal, and a fourth terminal adapted to being inserted into a relay receptacle.

3. The relay assembly for a fog light of claim 2 wherein the first terminal is electrically isolated from a relay receptacle.

4. The relay assembly for a fog light of claim 2 further comprising a coil and a switch portion with the switch portion being connected between the third terminal and the fourth terminal and the coil being connected between the first terminal and the second terminal.

5. The relay assembly for a fog light of claim 1 wherein the first terminal is connected to the switch by a wire.

6. The relay assembly for a fog light of claim 1 further comprising a coil and a switch portion with the switch portion being connected to the fog light and the first light and the coil being connected to the switch for operating the first light and the fog light.

7. The relay assembly for a fog light of claim 1 wherein the first terminal is connected to the switch by a wire and a fuse.

8. A relay assembly for fog lights comprising:
 a first relay portion having a coil and a switch operated by the coil, a first terminal connected to the coil, a second terminal connected to the coil, a third terminal connected to the switch, and a fourth terminal connected to the switch;
 a second relay portion having a first terminal; and
 a connection between the first terminal of the second relay portion and the third terminal of the first relay portion.

9. The relay assembly for fog lights of claim 8 wherein the second relay portion further comprises a second terminal, a third terminal, and a fourth terminal.

10. The relay assembly for fog lights of claim 9 wherein the second terminal, the third terminal, and the fourth terminal are adapted to mate with a relay receptacle.

11. The relay assembly for fog lights of claim 9 wherein the second terminal, the third terminal, and the fourth terminal are dummy terminals.

12. The relay assembly for fog lights of claim 8 wherein the connection comprises a wire.

13. The relay assembly for fog lights of claim 8 wherein the third terminal of the first relay portion is connected to a pair of headlights and the first terminal of the second relay portion is connected to a pair of fog lights.

14. A relay assembly for fog lights comprising:
 a housing having a first relay receiving portion and a second relay receiving portion, the first relay receiving portion being connected to a first terminal, a second terminal, a third terminal, and a fourth terminal, the second relay receiving portion being connected to a first terminal, and a connection between the first terminal of the second relay receiving portion and one of the terminals of the first relay receiving portion.

15. The relay assembly for fog lights of claim 14 wherein the second relay receiving portion further comprises a second terminal, a third terminal, and a fourth terminal.

16. The relay assembly for fog lights of claim 15 wherein the second terminal, the third terminal, and the fourth terminal are adapted to mate with a relay receptacle.

17. The relay assembly for fog lights of claim 15 wherein the second terminal, the third terminal, and the fourth terminal are dummy terminals.

18. The relay assembly for fog lights of claim 14 wherein the terminals of the first relay receiving portion are adapted to mate with a relay receptacle.

19. The relay assembly for fog lights of claim 14 wherein the connection comprises a wire.

20. The relay assembly for fog lights of claim 14 wherein one of the terminals of the first relay receiving portion is connected to a pair of headlights and the first terminal of the second relay receiving portion is connected to a pair of fog lights.

* * * * *